(12) United States Patent
Ruigrok et al.

(10) Patent No.: US 6,747,854 B1
(45) Date of Patent: Jun. 8, 2004

(54) MULTI-CHANNEL MAGNETIC HEAD WITH MAGNETORESISTIVE ELEMENTS

(75) Inventors: Jacobus J. M. Ruigrok, Eindhoven (NL); Gerardus H. J. Somers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 896 days.

(21) Appl. No.: 09/006,014

(22) Filed: Jan. 12, 1998

(30) Foreign Application Priority Data

Feb. 20, 1997  (EP) ............................................. 97200487

(51) Int. Cl.[7] ............................................. G11B 5/127
(52) U.S. Cl. ................................................. 360/327.3
(58) Field of Search ............................. 360/113, 327.3; 338/32 R; 324/252

(56) References Cited

U.S. PATENT DOCUMENTS

| | | | | |
|---|---|---|---|---|
| 4,686,472 A | | 8/1987 | Van Ooijen et al. ........ 324/252 |
| 4,896,235 A | * | 1/1990 | Takino et al. ............... 360/113 |
| 5,390,061 A | * | 2/1995 | Nakatani et al. ............ 360/113 |
| 5,483,735 A | | 1/1996 | Postma et al. .............. 360/113 |
| 5,493,467 A | | 2/1996 | Cain et al. .................. 360/113 |
| 5,531,016 A | | 7/1996 | Postma et al. ........... 29/603.16 |
| 5,535,077 A | | 7/1996 | Saito et al. ................. 360/113 |
| 5,600,297 A | | 2/1997 | Ruigrok et al. ........... 338/32 R |
| 5,822,159 A | * | 10/1998 | Fukuyama et al. ......... 360/113 |
| 5,973,889 A | * | 10/1999 | Ruigrok ...................... 360/113 |

FOREIGN PATENT DOCUMENTS

| | | | | |
|---|---|---|---|---|
| EP | 0422916 A2 | 4/1991 | ............ G11B/5/39 |
| EP | 0457278 A2 | 11/1991 | ............ G11B/5/39 |

* cited by examiner

*Primary Examiner*—David Davis
(74) *Attorney, Agent, or Firm*—Laurie E. Gathman

(57) ABSTRACT

Multi-channel magnetic head having a high channel density, provided with a head face (1) which extends in a first direction (I) in which a record carrier is relatively movable with respect to said magnetic head, and in a second direction (II) transverse to the first direction. The magnetic head has a structure of layers which, viewed in the first direction, are situated one on top of the other and extend substantially in the second direction and in a third direction (III) transverse to the first and the second direction. Viewed in the second direction, adjacent magnetoresistive sensors ($S_1$, $S_2$, $S_3$) are distinguishable in the structure, each comprising a magnetoresistive measuring element (5), a first magnetic element (7) and a second magnetic element (9). The magnetic elements of adjacent sensors are electrically conducting and have electric connection faces (70a, 9a), while the measuring element in each sensor is electrically arranged in series between the first and the second magnetic element for passing a measuring current (i) through the measuring element substantially in the third direction.

10 Claims, 4 Drawing Sheets

MULTI-CHANNEL MAGNETIC HEAD WITH MAGNETORESISTIVE ELEMENTS

BACKGROUND OF THE INVENTION

Figure 1:
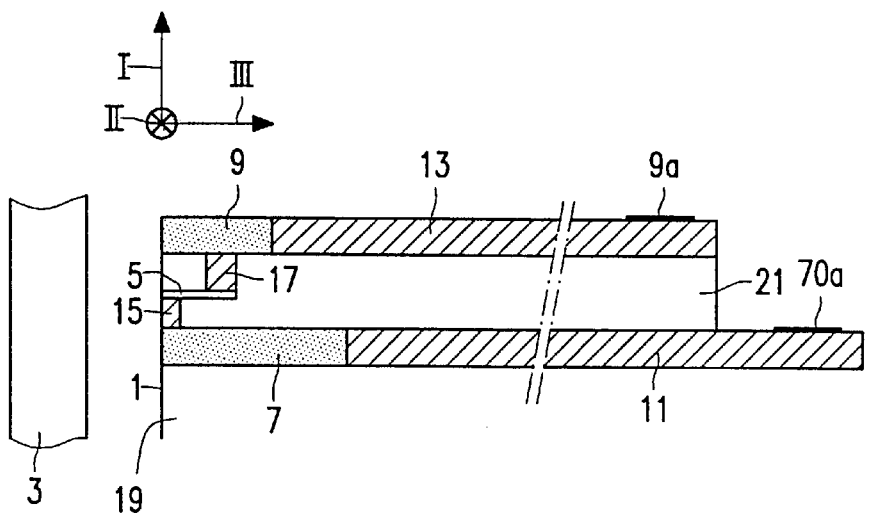

The invention relates to a multi-channel magnetic head having a head face which extends in a first direction in which a record carrier is relatively movable with respect to said magnetic head, and in a second direction transverse to the first direction, said magnetic head having a structure of layers which, viewed in the first direction, are situated one on top of the other and extend substantially in the second direction and in a third direction transverse to the first and the second direction, in which structure, viewed in the second direction, adjacent magnetoresistive sensors are distinguishable, each comprising a magnetoresistive measuring element, a first magnetic element and a second magnetic element, and in which, viewed in the first direction, the magnetic elements are situated opposite each other, at least the first magnetic element of said elements extending as far as the head face.

A multi-channel magnetic head of this type is known from EP-A 0 422 916. The known magnetic head comprises several magnetoresistive elements each forming part of a magnetic yoke which also comprises a shared flux guide and a magnetic substrate. During use, a measuring current for measuring resistance variations is passed through the magnetoresistive elements. To this end, each magnetoresistive element is provided with a current supply and a current return conductor which extend along the magnetic yoke. As a result of these conductors, the magnetoresistive elements in the known multi-channel head are situated at relatively large mutual distances so that only relatively small channel densities can be realized.

OBJECTS AND SUMMARY OF THE INVENTION

It is an object of the invention to provide a multi-channel magnetic head in which the channel density is independent of the current supply and current return conductors of the magnetoresistive measuring elements which are present.

The magnetic head according to the invention is characterized in that both magnetic elements of each of the at least two adjacent magnetoresistive sensors are electrically conducting, the measuring element being electrically arranged in series between the two magnetic elements for passing a measuring current through the measuring element substantially in the third direction, both magnetic elements having an electric connection face. By having the same elements perform both magnetical and electrical functions, the separate sensors may be given a compact shape. Particularly the width, viewed in the second direction, of the sensors can be completely determined by the desired channel width. Consequently, magnetoresistive measuring elements may be provided very close together, which results in large channel densities. An additional, but important advantage is that electrostatic discharge problems can be prevented because insulating oxide layers between the measuring elements and the magnetic elements and between the magnetic elements themselves are not necessary, across which layers electric charge might build up and discharge. The absence of insulating oxide layers between measuring elements and magnetic elements also ensures a favorable efficiency. A further advantage is that the measuring elements are electrically connected to the magnetic elements so that a possible flashover from a measuring element to a magnetic element is prevented.

An anisotropic magnetoresistive (AMR) element or a giant magnetoresistive (GMR) element may be used as a measuring element. An AMR element may be, for example a layer of an NiFe alloy with or without equipotential strips which are generally referred to as barberpole stripes. A favorable embodiment of the AMR element is a laminated magnetoresistive element of the type as shown in U.S. Pat. No. 4,686,472 (herein incorporated by reference). A favorable GMR element is described in, for example WO-A to which U.S. Pat. No. 5,600,297 corresponds, herein incorporated by reference).

An AMR element may be biased by using a DC current-conveying conductor preferably placed between the magnetic elements. A GMR element of, for example the spin valve type has the advantage that biasing is not absolutely required.

The multi-channel magnetic head according to the invention may be manufactured by means of a known thin-film technology, in which the magnetic elements are thin films formed from, for example, NiFe, CoNbZr or FeNbSi—N. One of the magnetic elements may be alternatively constituted by an electrically conducting, magnetically permeable substrate.

In principle, the multi-channel magnetic head according to the invention is suitable for any application in which narrow, closely spaced tracks must be scanned. Examples are tape streamers, digital video recorders, hard disk drives and multimedia recorders for video/data storage. Particularly in linear recorders, a large number of tracks is desired so as to achieve a high data rate due to the relatively low speed of the information medium with respect to the head. This speed is considerably higher in helical-scan recorders.

An embodiment of the multi-channel magnetic head according to the invention is characterized in that, of each of at least two adjacent sensors, an electrically conducting third magnetic element extending as far as the head face is present, which third element, together with the second magnetic element not extending as far as the head face, bounds a non-conducting space which is bridged by the magnetoresistive element which, beside said space, is in electric contact with the second and the third magnetic element, while an electrically conducting gap layer electrically interconnecting the first magnetic element and the third magnetic element extends proximate to the head face. In this embodiment, which is of the yoke type, the magnetic elements are used for electrically conducting measuring currents and for the supply and return of magnetic flux coming from the medium to be scanned. The magnetic elements are therefore current-conveying flux guides during operation. The gap layer is preferably a metal layer of, for example Ag or Cu.

It is to be noted that a single-channel magnetic head of the yoke type, in which electrically conducting yoke parts are used, is known from U.S. Pat. No. 5,493,467. The known magnetic head is provided with one spin-valve magnetoresistive element incorporated in a magnetic yoke. Two yoke parts of this yoke are electrically interconnected on a head face of the magnetic head by means of an electrically conducting gap layer. One of the yoke parts has an interruption which is electrically and magnetically bridged by the magnetoresistive element. In an area spaced apart from the head face, the yoke parts are provided with electrically conducting layers which are oriented transversely to the yoke parts and terminate in connection faces present beside the yoke parts.

An embodiment of the multi-channel magnetic head according to the invention is characterized in that the magnetoresistive measuring element of each of at least two adjacent sensors adjoins the head face, while a part of the measuring element situated proximate to the head face is electrically connected to one of the two magnetic elements, being the first or the second magnetic element, and a part of the measuring element spaced apart from the head face is electrically connected to the other magnetic element of the two elements. In this embodiment, which is of the shielded type, the magnetic elements are used for electrically conducting measuring currents and for magnetically shielding the measuring elements. The magnetic elements are therefore current-conveying shields during operation. The electric connections between the measuring elements and the magnetic elements may be constituted by mutual contact faces or by electrically conducting intermediate layers which are present, such as metal layers of, for example gold or copper. When AMR elements are used, it may be favorable, in connection with biasing, to form the electrically conducting intermediate layers spaced apart from the head face from an electrically conducting anti-ferromagnetic material such as FeMn.

It is to be noted that a single-channel magnetic head having a shielded magnetoresistive element is known from EP-A 0 457 278. The magnetic head has a lower and an upper shielding magnetic layer, between which layers the magnetoresistive element extends. The magnetoresistive element is provided with electrodes at a head face of the magnetic head and at an edge spaced apart from the head face, while the electrode on the head face is electrically connected via a conducting layer to the upper shielding layer which is grounded via an electric wire, and the electrode spaced apart from the head face is electrically connected to the input of an amplifier unit via an electric wire.

An embodiment of the magnetic head according to the invention is characterized in that the connection face of the first magnetic element and the connection face of the second magnetic element of each of at least two adjacent sensors are situated within a zone having an extensiveness in the second direction which is determined by the extensiveness in the second direction of the relevant magnetic element. Multi-channel heads having large channel densities can be technologically realized in a simple manner by this practical measure. A further measure, in which the connection face of the first magnetic element and the connection face of the second magnetic element of each of at least two adjacent sensors are situated on the relevant magnetic element, also leads to a reduction of the number of technology steps. For connecting the multi-channel head in a scanning device, it is favorable if, viewed in the third direction, the connection face of the first magnetic element of each of at least two adjacent sensors is offset with respect to the connection face of the second magnetic element.

An embodiment of the magnetic head according to the invention is characterized in that at least two adjacent sensors have a common electrically conducting magnetic element constituting the first magnetic element in each sensor. The common magnetic element which is present renders a favorable shape-anisotropy possible, inhibiting the creation and possible displacement of domain walls in the first magnetic elements, which is favorable for the signal-to-noise ratio. If third magnetic elements are present, they may be formed as common elements, with or without the presence of the above-mentioned common magnetic element.

An embodiment of the magnetic head according to the invention is characterized in that at least the first magnetic element of each of at least two adjacent sensors has a relative magnetic permeability which is larger in the third direction than in the second direction. The magnetic anisotropy which is present ensures an accurately defined scanning width. The measure formulated here has a favorable effect on magnetic heads with sensors provided with individual magnetic elements which are spaced apart at some distance, and on magnetic heads in which a common magnetic element is used. In the latter case, the anisotropy ensures the desired channel separations. The manufacture of such magnetic heads has technological advantages, particularly in that fewer and less complicated manufacturing steps are required for which, in principle, the common magnetic element requires no structuring.

It has been found that as the permeability in the third direction is larger with respect to the permeability in the second direction, the sharpness of the channel separation increases so that larger channel densities are possible. A suitable value appears to be given if the relative magnetic permeability in the third direction is at least a factor of 25 larger than the relative magnetic permeability in the second direction.

The invention also relates to a device for scanning a record carrier such as a magnetic tape or disc, which device includes the multi-channel magnetic head according to the invention.

These and other aspects of the invention are apparent from and will be elucidated with reference to the embodiments described hereinafter.

BRIEF DESCRIPTION OF THE INVENTION

Figure 2:
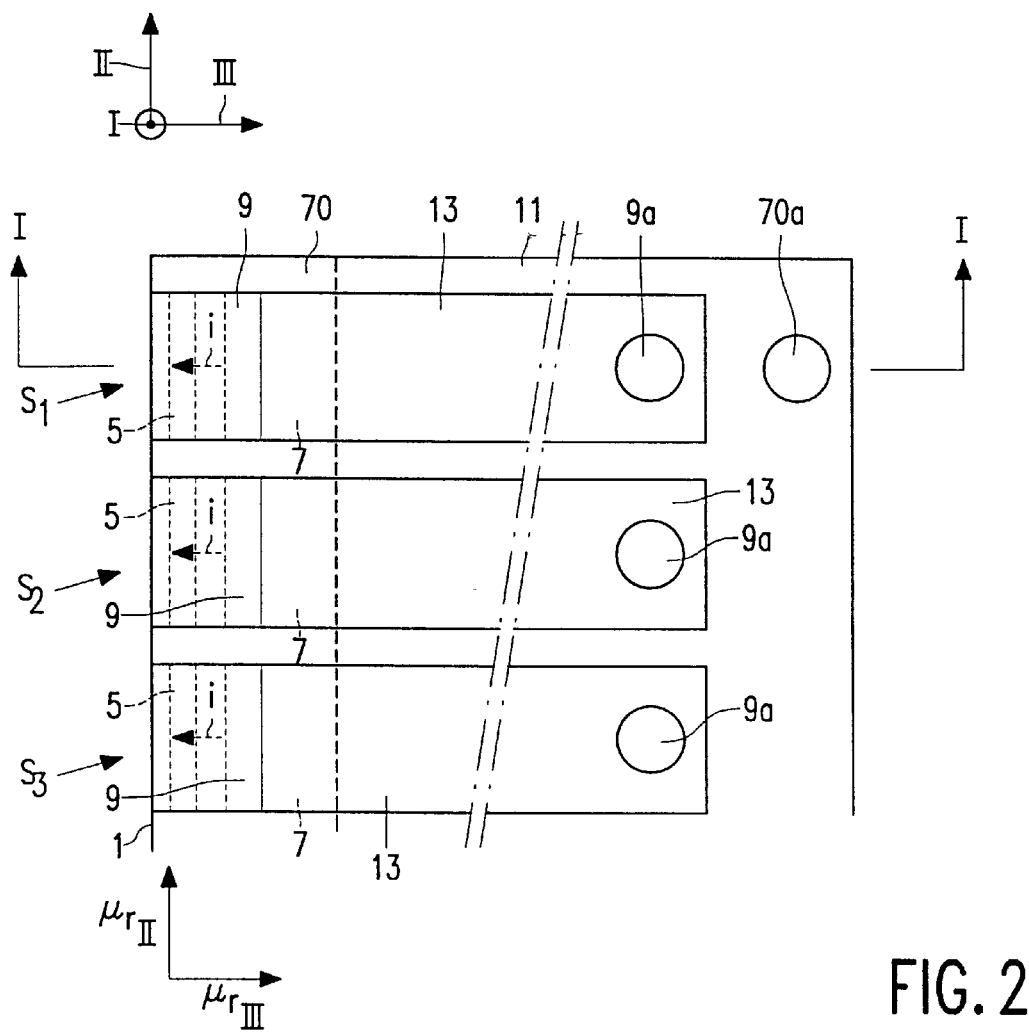
Figure 3:
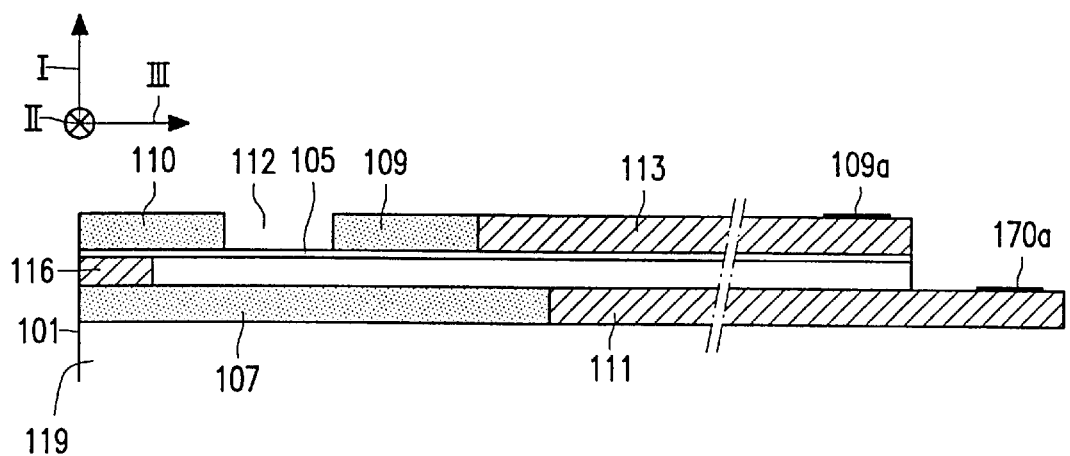
Figure 4:
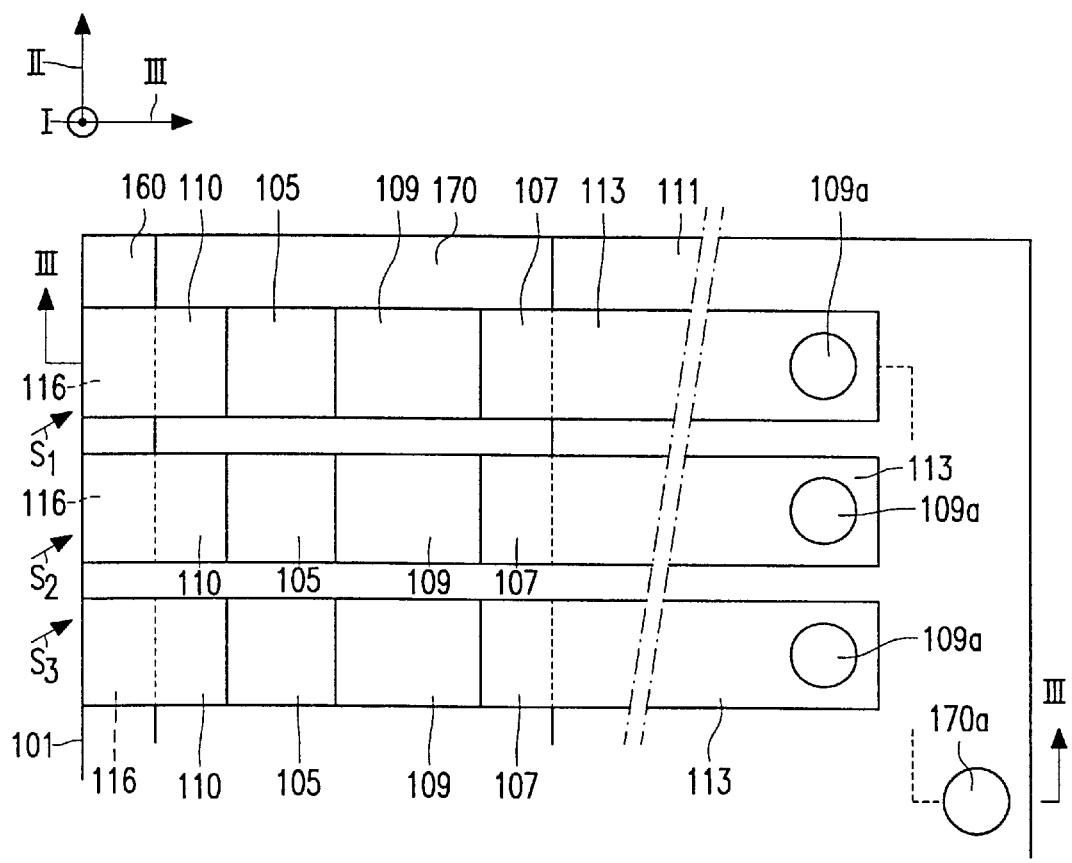
Figure 5:
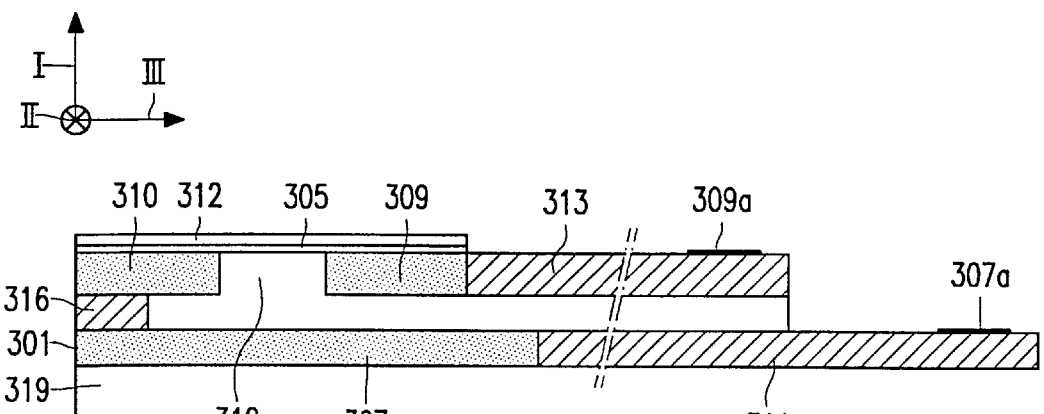
Figure 6:
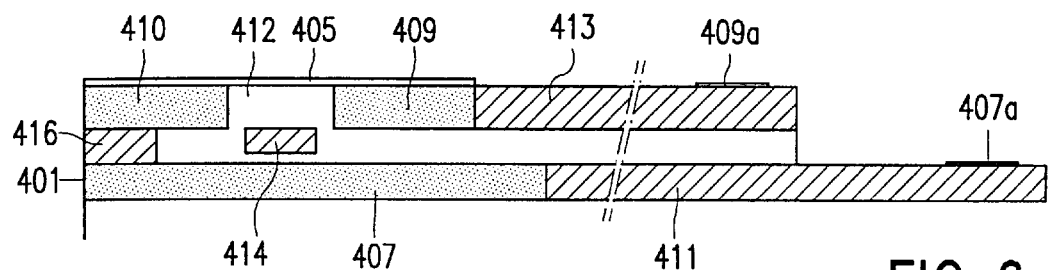
Figure 7:
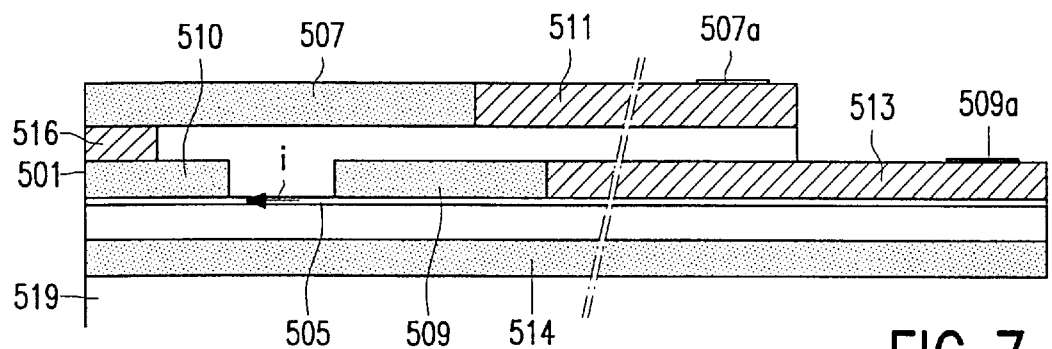
Figure 8:
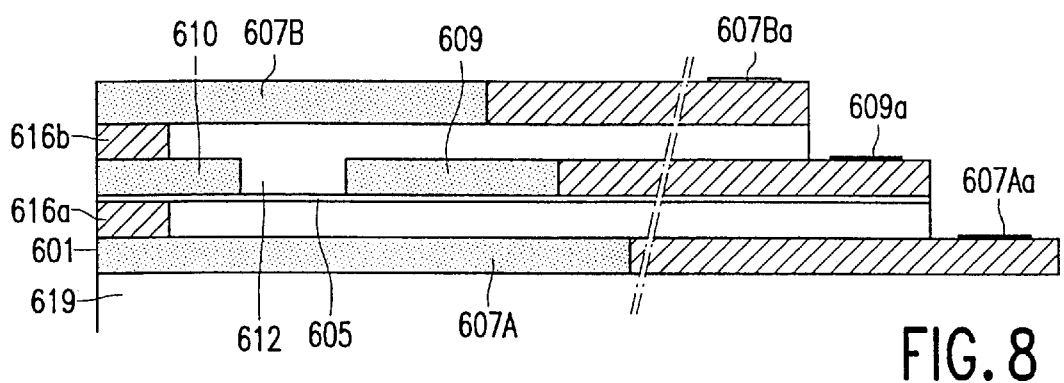
Figure 9:
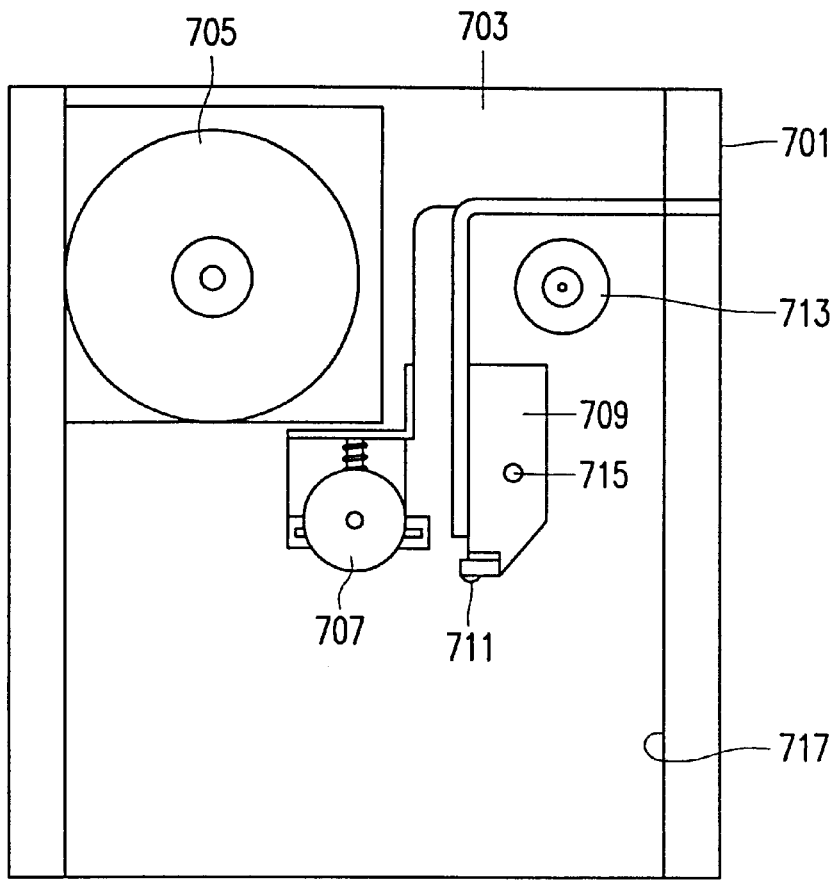
Figure 10:
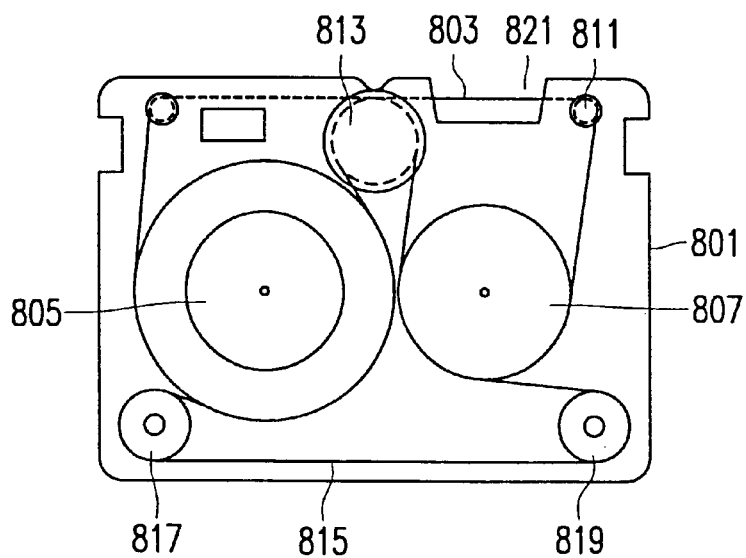

In the drawings:

FIG. 1 is a diagrammatic cross-section of a first embodiment of the magnetic head according to the invention, FIG. 2 is a diagrammatic plan view of a second embodiment, FIG. 3 is a diagrammatic cross-section of a second embodiment, FIG. 4 is a diagrammatic plan view of the second embodiment, FIG. 5 is a diagrammatic cross-section of a third embodiment, FIG. 6 is a diagrammatic cross-section of a fourth embodiment, FIG. 7 is a diagrammatic cross-section of a fifth embodiment, FIG. 8 is a diagrammatic cross-section of a sixth embodiment, FIG. 9 shows diagrammatically an embodiment of the device according to the invention, and FIG. 10 shows diagrammatically an embodiment of a magnetic tape cassette suitable for cooperation with the invention shown.

DESCRIPTION OF THE PREFERRED EMBODIMENTS

The multi-channel magnetic head according to the invention, shown in FIGS. 1 and 2, is of the shielded type. The cross-section shown in FIG. 1 is taken on the line I—I in FIG. 2. The magnetic head has a head face 1 for cooperation with a magnetic record carrier 3, in this embodiment a magnetic tape, which record carrier 3 is relatively movable with respect to the magnetic head in a first direction I. The record carrier 3 has information tracks which extend at least substantially parallel to the first direction I. The head face 1 extends in the first direction I and in a second direction II which is transverse to the first direction I. The magnetic head comprises a thin-film structure which, in this embodiment, is realized on a non-magnetic substrate 19, for example, an $Al_2O_3$/TiC substrate, by means of known deposition, structuring and planarization techniques. Such techniques have been described in, for example, EP-A 0 617 409 and EP-A 0 617 410 to which U.S. Pat. No. 5,531,016 and 5,483,735, correspond respectively, both herein incorporated by reference.

The thin-film structure has layers which, viewed in the first direction I, are situated one on top of the other which extend substantially in the second direction II and in a third direction III transverse to the second direction II. Viewed in the second direction, a plurality of adjacent or neighboring magnetoresistive sensors are formed, or at least distinguishable, in the film structure. The number of magnetoresistive sensors present is dependent on the use of the magnetic head but, in principle, is unlimited. In a practical application, the number of magnetoresistive sensors is, for example 16. FIG. 2 shows three magnetoresistive sensors present in the magnetic head, denoted by $S_1$, $S_2$ and $S_3$, respectively. Each sensor comprises a magnetoresistive measuring element 5, a first magnetic element 7 and a second magnetic element 9. The measuring elements 5 may be of the GMR or the AMR type. The magnetic elements 7 and 9 are formed by layers of an electrically conducting, magnetically permeable material, which is NiFe in this embodiment. The magnetic elements 7 and 9 of each sensor and the measuring element 5 situated in between extend as far as the head face 1. In order to obtain a favorable shape-anisotropy to inhibit the creation of magnetic domains, a common, first magnetic element 70 is used in this embodiment, of which said first elements 7 form part. In each sensor $S_1$, $S_2$ and $S_3$, the measuring element 5 is electrically arranged in series between the magnetic elements 7 and 9. To this end, electrically conducting intermediate layers 15 and 17 of, for example a metal such as gold or copper are present in the thin-film structure, in which, in each sensor, the intermediate layer 15 adjoining the head face 1 electrically connects the measuring element to the first magnetic element 7, and the intermediate layer 17 remote from the head face 1 electrically connects the measuring element 5 to the second magnetic element 9. Since the magnetic elements 7 and 9 not only have a magnetical function but also an electrical function, notably a current-conveying function, the magnetic elements 7 and 9 are provided with electric connection faces. In this embodiment, the first magnetic elements 7 have one common connection face 70a and the second magnetic elements 9 have a separate connection face 9a each. When the record carrier 3 is being scanned, the magnetic elements 7 and 9 convey a current, while a measuring current i in a direction transverse to the head face 1, i.e. parallel to the direction III, is passed through the measuring elements 5. The electric connection faces 70a and 9a are formed by means of known deposition and planarization methods and form part of an electrically conducting layer 11 and electrically conducting layers 13, respectively, with the layer 11 in each sensor being in electric contact with the magnetic element 7 and a layer 13 being in electric contact with the magnetic element 9. The layers 11 and 13 are, for example gold or copper layers.

If desired, the layers 11 and 13 may be formed from a magnetically permeable, electrically conducting material and therefore form part of the magnetic elements 7 and 11, respectively. In that case, the connection faces are directly present on the magnetic elements. For biasing the magnetoresistive measuring elements 5, the intermediate layers 17 spaced apart from the head face 1 may be constituted by a conducting layer of an electrically conducting antiferromagnetic material such as an FeMn alloy, or by an electrically conducting hard-magnetic material such as a CoPt alloy.

The magnetic elements 7 and 9 in this embodiment have a relative permeability $\mu_{rIII}$ in the third direction III which is larger than the relative permeability $\mu_{rII}$ in the second direction. The ratio is preferably at least a factor of 25.

As is apparent from FIG. 2, the connection face 70a is situated within a zone having an extensiveness in the second direction II which is determined by the extensiveness in the second direction II of the common magnetic element 70. Each connection face 9a is present in a zone having an extensiveness in the second direction II which is determined by the extensiveness in the second direction II of the associated magnetic element 9. It is also apparent from FIG. 2 that the common connection face 70a, viewed in the third direction III, is offset with respect to the connection faces 9a.

It is to be noted with reference to the thin-film structure that insulation layers of, for example $SiO_2$ or $Al_2O_3$ are present between various magnetic and/or electrically conducting layers. In FIG. 1, these layers are jointly denoted by the reference numeral 21.

To avoid unnecessary repetition, the following descriptions of further embodiments will mainly be limited to characteristic features differing from the embodiment already described. The directions I, II and III introduced in this embodiment are applicable to all embodiments.

The multi-channel magnetic head according to the invention, shown in FIGS. 3 and 4, has a head face 101 and a non-magnetic substrate 119 on which a film structure having various magnetoresistive sensors is provided. The cross-section shown in FIG. 3 is taken on the line III—III in FIG. 4. FIG. 4 shows three of these sensors, denoted by $S_1$, $S_2$ and $S_3$, respectively. Each sensor is of the yoke type, a magnetic yoke being constituted by soft-magnetic, electrically conducting layers and a magnetoresistive measuring element 105 of the AMR type or the GMR type. Said layers of, for example CoNbZr constitute a first magnetic element 107, a second magnetic element 109 and a third magnetic element 110. A non-magnetic, non-electrically conducting space 112 is present between the magnetic elements 109 and 110, which space is bridged by the measuring element 105 which is in direct electric contact on both sides of the space 112 with the magnetic elements 109 and 110. The magnetic elements 107 and 110, both of which adjoin the head face 101, are electrically interconnected proximate to the head face 101 by means of an electrically conducting intermediate layer 116 of, for example gold. Due to this configuration of electrically conducting layers, the magnetoresistive element 105 in each sensor $S_1$, $S_2$ and $S_3$ is electrically in series with the magnetic elements 107, 109 and 110. In this embodiment, the first magnetic elements 107 are implemented as a common element 170. The intermediate layers 116 are implemented as a common intermediate layer 160. The element 170 is electrically connected to an electrically conducting layer 111 with a connection face 170a. Each element 109 is electrically connected to an electrically conducting layer 113 with an electric connection face 109a.In this embodiment, at least the magnetic elements 107 forming part of the common magnetic element 170 have a relative permeability in the third direction III which is larger, preferably 25 times larger, than the relative permeability in the second direction II.

The embodiments shown in FIGS. 5 to 8 are variants of the embodiment shown in FIGS. 3 and 4. In view of the close relationship with the last-mentioned embodiment, the plan views of said variants are not shown. The magnetic elements used in the variants have properties corresponding to the embodiments described hereinbefore.

Each multi-channel magnetic head according to the invention, shown in FIGS. 5 to 8, has a structure with adjoining magnetoresistive sensors, as viewed in the second direction II.

The multi-channel magnetic head according to the invention, shown in FIG. 5, has a head face 301 and a non-magnetic substrate 319 provided with a layer structure with various magnetoresistive sensors. Each sensor comprises a magnetic yoke having a first magnetic element 307, a second magnetic element 309, a third magnetic element 310 and a magnetoresistive measuring element 305. The magnetic elements 307, 309 and 310 are constituted by soft-magnetic layers of an electrically conducting material such as FeNbSi—N. In this embodiment, the measuring element 305 is an AMR element. While forming electric contacts, the measuring element 305 engages the magnetic elements 309 and 310, bridging a non-magnetic, non-electrically conducting space 312 between the two elements 309 and 310. A non-magnetic, electrically conducting gap layer 316 electrically interconnecting the magnetic elements 307 and 310 is present at the head face 301. The magnetic elements 307 and 309 have a connection face 307a and 309a, respectively, which are present on electrically conducting, non-magnetic layers 311 and 313 electrically connected to the magnetic elements 307 and 309, so that an electric circuit comprising the measuring element 305 and the magnetic elements 307, 309 and 310 is formed in each sensor between the connection faces 307a and 309a, in which circuit the measuring element 305 is arranged in series with the elements 307 and 309. For biasing the measuring elements 305, a layer 312 of an anti-ferromagnetic material such as NiOx is provided on each measuring element 305.

The multi-channel magnetic head according to the invention, shown in FIG. 6, is of the yoke type, in which each magnetoresistive sensor comprises a magnetoresistive measuring element 405 which, similarly as described with reference to FIG. 5, is electrically arranged in series with a first magnetic element 407 and a second magnetic element 409. In each sensor, an electrically conducting gap layer 416 electrically interconnecting the magnetic elements 407 and third magnetic elements 410 extending as far as the head face 401 is present at a head face 401. The magnetic elements 407 and 409 have electric connection faces 407a and 409a. For biasing the measuring elements 405, an electrically conducting bias winding 414 is present in each sensor.

The multi-channel magnetic head according to the invention, shown in FIG. 7, has a head face 501 and a non-magnetic substrate 519 on which a thin-film structure with various magnetoresistive sensors is provided. Each sensor comprises a magnetically permeable layer 514 of, for example NiFe, CoNbZr or FeTa—N, a magnetoresistive measuring element 505, a first magnetic element 507 and two spaced magnetic elements, i.e. in the terminology of this description, a second magnetic element 509 and a third magnetic element 510. The magnetic elements 507 and 509 have connection faces 507a and 509a present on electrically conducting layers 511, 513, respectively. An electrically conducting gap layer 516 in each sensor electrically interconnects the magnetic elements 507 and 510, while the measuring element 505 electrically connects the magnetic element 510 to the magnetic element 509 so that, during operation, a current flows through the measuring element 505 in a direction i transverse to the head face 501. In this embodiment, the magnetic elements 507, 509 and 510 are current-conveying flux guides during operation, while the magnetic layer 514 constitutes a shielding layer against long magnetic waves.

The variant shown in FIG. 8 has a head face 601 and a non-magnetic substrate provided with a multilayer structure and a plurality of magnetoresistive sensors. In each sensor, magnetoresistive measuring element 605 comprises a first magnetic element constituted by two electrically conducting, magnetically permeable layers 607A and 607B, a second magnetic element constituted by an electrically conducting, magnetically permeable 15 layer 609 and a third magnetic element constituted by an electrically conducting, magnetically permeable layer 610, the measuring element 605 electrically and mechanically bridging a non-electric, non-magnetic space 612 between the second magnetic element 609 and the third magnetic element 610. Proximate to the head face 601, the third magnetic element 610 is electrically connected to the layers 607A and 607B by means of two electrically conducting layers 616A and 616B. The second magnetic element 609 and the layers 607A and 607B have electric connection faces 609a,607Aa and 607Bb, respectively. In the electric circuit used in the magnetic head shown in FIG. 8, a current flows through each measuring element 605 during scanning, which current has a value which is equal to the sum of the currents through the layers 607A and 607B of the first magnetic element, while the current direction in the measuring element 605 is transverse to the head face 601. The layers 607A and 607B have a shielding effect against long magnetic waves; related thereto, this magnetic head as well as the magnetic heads shown in FIGS. 1 and 7, have a substantially spatially differentiating effect as compared with the embodiments shown in FIGS. 3, 5 and 6.

It is to be noted that embodiments different from those shown are possible within the scope of the invention. For example, the magnetic head according to the invention may form part of, for example a combined write/read magnetic head unit. Moreover, for protection of the multilayer structure, magnetic heads in practical embodiments are generally provided with a counter block.

The device according to the invention, shown in FIG. 9, is suitable for writing and/or reading a magnetic tape 803 which, in this embodiment, is present in the cassette 801 shown in FIG. 10. The device has a housing 701 with a frame 703. The housing 701 accommodates, inter alia, a drive motor 705 for driving a drive roll 707 and a multi-channel magnetic head 711 according to the invention, which, in this embodiment, is secured to a sub-frame 709 which is movable along a guiding shaft 715 by means of a drive motor 713. The device also has a straight guiding member 717 for sliding the cassette 801 into and out of the housing 701. The cassette 801 may be used, for example, for storing information in a digital form. The cassette has two reels 805 and 807 on which a part of the magnetic tape 803 is present. The part of the magnetic tape 803 present between the two reels is guided along two tape-guiding members 809 and 811 which are stationary in this embodiment and runs along a capstan 813. The cassette 801 includes an endless drive belt 815 which runs along the capstan 813, the reels 805 and 807 and two belt-guiding members 817 and 819. In an operating state, in which the cassette 801 cooperates with the device 701 according to the invention, the magnetic head 711 projects into a recess 821 in the cassette and is then in contact with the magnetic tape 803. Simultaneously, the drive roll 707 is in contact with the capstan 813 via which the magnetic tape 803 is longitudinally movable from one reel to the other.

The device shown is a data storage device and may be, for example an audio and/or video apparatus. The device may also be adapted in such a way that the record carrier is a magnetic disc or a magnetic card instead of a magnetic tape.

What is claimed is:

1. A multi-channel magnetic head having a head face which extends in a first direction and in a second direction transverse to the first direction, for scanning a record carrier which is relatively movable with respect to the magnetic head in the first direction, comprising a structure of layers which extend respectively substantially in the second direction and in a third direction transverse to the first and second directions, said layers being disposed one on top of the other as viewed in the first direction, said structure including a plurality of magnetoresistive sensors, each of said magnetoresistive sensors comprising a magnetoresistive measuring element, a first magnetic element and a second magnetic element respectively, said magnetoresistive measuring elements being arranged such that, viewed in the second direction, adjacent magnetoresistive sensors are distinguishable; and, viewed in the first direction, the magnetic elements are opposite each other, at least the respective first magnetic elements extending as far as the head face, characterized in that both magnetic elements of each of at least two adjacent magnetoresistive sensors are electrically conducting and have respective electric connection faces, the respective magnetoresistive measuring element being electrically arranged in series between the respective two magnetic elements for passing a measuring current through the measuring element substantially in the third direction.

2. A magnetic head as claimed in claim 1, characterized in that at least two adjacent sensors have a common electrically conducting magnetic element constituting the first magnetic element in each sensor.

3. A magnetic head as claimed in claim 1, characterized in that at least the first magnetic element of each of at least two adjacent sensors has a relative magnetic permeability which is larger in the third direction than in the second direction.

4. A magnetic head as claimed in claim 3, characterized in that the relative magnetic permeability in the third direction is at least a factor of 25 larger than the relative magnetic permeability in the second direction.

5. A device for scanning a record carrier, including the multi-channel magnetic head as claimed in claim 1.

6. A magnetic head as claimed in claim 1, characterized in that first and second adjacent magnetoresistive sensors each include a respective electrically conducting third magnetic element extending as far as the head face, the respective second magnetic element of said first and second adjacent magnetoresistive sensors do not extend as far as the head face, the respective second and third magnetic elements of said first sensor bound a non-conducting space which is bridged by the respective magnetoresistive element, said respective magnetoresistive element being in electric contact with the respective second and third magnetic elements, and said head further comprises an electrically conducting gap layer extending proximate to the head face, and electrically interconnecting the respective first magnetic element and the respective third magnetic element.

7. A magnetic head as claimed in claim 1, characterized in that the respective magnetoresistive measuring element of each of at least two adjacent magnetoresistive sensors adjoins the head face, each of said respective measuring elements having a first part disposed proximate to the head face and a second part disposed spaced from the head face respectively, the first parts being respectively connected electrically to one of the respective magnetic elements, and the second parts parts being respectively connected electrically to the other of the respective magnetic elements.

8. A magnetic head as claimed in claim 1, characterized in that the connection face of the first magnetic element and the connection face of the second magnetic element of one of two adjacent sensors are disposed within a respective zone extending in the second direction a first distance determined by a corresponding second distance the respective magnetic element extends in the second direction.

9. A magnetic head as claimed in claim 8, characterized in that, viewed in the third direction, the connection face of the first magnetic element of each of at least two adjacent sensors is offset with respect to the connection face of the second magnetic element.

10. A magnetic head as claimed in claim 1, characterized in that the respective connection face of the first magnetic element of each of at least two adjacent sensors are disposed on the first magnetic elements respectively, and the respective connection face of the second magnetic element of each of said at least two adjacent sensors are disposed on the second magnetic elements respectively.

* * * * *